United States Patent
Wang

(10) Patent No.: US 11,885,664 B2
(45) Date of Patent: Jan. 30, 2024

(54) METHOD AND SYSTEM FOR COLLECTING PRONE POSITION DATA OF HUMAN BODY

(71) Applicant: NVC INDUSTRIAL (HK) CO., LIMITED, Hong Kong (CN)

(72) Inventor: Donglei Wang, Zhuhai (CN)

(73) Assignee: NVC INDUSTRIAL (HK) CO., LIMITED, Hong Kong (CN)

( * ) Notice: Subject to any disclaimer, the term of this patent is extended or adjusted under 35 U.S.C. 154(b) by 173 days.

(21) Appl. No.: 17/466,332

(22) Filed: Sep. 3, 2021

(65) Prior Publication Data
US 2023/0008113 A1 Jan. 12, 2023

(30) Foreign Application Priority Data

Jul. 10, 2020 (CN) .......................... 202010660152.X
Jul. 8, 2021 (CN) .......................... 202110772663.5

(51) Int. Cl.
*G01G 19/44* (2006.01)
*G01G 19/50* (2006.01)

(52) U.S. Cl.
CPC ........... *G01G 19/445* (2013.01); *G01G 19/50* (2013.01)

(58) Field of Classification Search
CPC .... G01G 19/445; G01G 19/50; A47C 23/002; A47C 23/0433; A47C 23/0435; A47C 27/083; A47C 27/061
See application file for complete search history.

(56) References Cited

U.S. PATENT DOCUMENTS

| | | | |
|---|---|---|---|
| 9,033,901 B2 * | 5/2015 | Woolfson | G01F 17/00 600/587 |
| 10,588,420 B1 * | 3/2020 | Krenik | A47C 19/027 |
| 2008/0052837 A1 * | 3/2008 | Blumberg | A47C 27/10 600/300 |
| 2015/0351982 A1 * | 12/2015 | Krenik | A47C 23/06 5/616 |
| 2018/0125256 A1 * | 5/2018 | Tsern | A61M 21/02 |
| 2019/0104860 A1 * | 4/2019 | Blumberg | A61G 7/00 |
| 2021/0000263 A1 * | 1/2021 | Cao | A47G 9/1027 |

FOREIGN PATENT DOCUMENTS

CN 109141605 A * 1/2019

OTHER PUBLICATIONS

Machine translation of CN-109141605-A (Year: 2019).*

* cited by examiner

*Primary Examiner* — Natalie Huls
(74) *Attorney, Agent, or Firm* — Workman Nydegger

(57) ABSTRACT

A method for collecting prone position data of a human body is disclosed. The method includes: collecting weight data, back contour data and height data of a standing subject; receiving the weight data, the back contour data, and the height data, pre-preprocessing such data, and sending the pre-processed pre-processing data to a simulated bed by a processing center; receiving the pre-processed data and adjusting an initial pressure of a plurality of elastic columns of the simulated bed according to the pre-processed data by the simulated bed; causing the subject to lie on the adjusted simulated bed and further adjusting the simulated bed according to a subjective description of the subject until the simulated bed is suitable for the subject; collecting adjustment data of the simulated bed suitable for the subject by the processing center. A system for collecting prone position data of a human body is also disclosed.

14 Claims, 15 Drawing Sheets

METHOD AND SYSTEM FOR COLLECTING PRONE POSITION DATA OF HUMAN BODY

CROSS REFERENCE TO RELATED APPLICATION

This application claims priority to Chinese Patent Application No. 202110772663.5, filed on Jul. 8, 2021, and Chinese Patent Application No. 202010660152.X, filed on Jul. 10, 2020, in the China National Intellectual Property Administration, the disclosure of which is hereby incorporated by reference in its entirety.

TECHNICAL FIELD

The present disclosure relates to the field of furniture production data collection, and particularly to a method and system for collecting prone position data of a human body.

BACKGROUND

In the prior art, bed is a necessity for people's lives. Due to the individual differences of people, it is necessary to measure specific parameters a human body, such as height, weight, girths of various parts and the like, when a personalized mattress is customized. The personalized mattress is preliminarily produced according to the specific parameters of the human body. Then the customized parameters are adjusted through the actual use experience. According to the measurement method and the production method of the prior art, the body parameters measurement and the sample production not only time-consuming and costly, but also requires the people with professional skill to complete. The efficiency is very low and the limitation is very great.

SUMMARY

The purpose of the present disclosure is to improve the shortcomings of the prior art, and provide a method and a system for collecting prone position data of a human body, which can quickly and automatically measure parameters of a human body and quickly form a customized experience mattress.

According to an aspect of the present disclosure, a method for collecting prone position data of a human body is provided. The method includes: causing a subject to stand on a weight collector, and collecting weight data of the subject by the weight collector; causing the subject to stand, and collecting back contour data of the subject with a contour collector; collecting height data of the subject by the weight collector or the contour collector; receiving the weight data, the back contour data, and the height data, pre-preprocessing the weight data, the back contour data, and the height data, and sending the pre-processed pre-processing data to a simulated bed by a processing center; receiving the pre-processing data and adjusting an initial pressure of a plurality of elastic columns of a simulated bed according to the pre-processing data by the simulated bed; causing the subject to lie on the adjusted simulated bed and further adjusting the simulated bed according to the subjective description of the subject until the simulated bed is suitable for the subject; and collecting adjustment data of the simulated bed suitable for the subject by the processing center.

In an embodiment, the weight collector is integrated with the contour collector, the weight data of the subject is collected while the height data is also collected, and the back contour data is also collected in the contour collector.

In an embodiment, the contour collector includes a measuring plate and a plurality of distance measuring columns distributed on the measuring plate, the measuring plate is movable relative to a standing plate of the subject, the measuring plate is configured to stop moving after moving to a preset position, and the contour collector is configured to obtain position data of the distance measuring column in a compressed state.

In an embodiment, the measuring plate is configured to move to the back of the subject, so that the distance measuring columns are gradually in contact with a back contour of the subject and compressed, and configured to stop moving when one of the distance measuring columns is compressed at a maximum compression amount. All the distance measuring columns are in contact with the subject's body within the range of the front projection of the subject's body at this time, and the contour collector is configured to obtain the position data of the distance measuring column.

In an embodiment, the pre-processing the data by the processing center includes: calculating a distribution of the weight of the subject according to the weight data, the back contour data, and the height data.

In an embodiment, the elastic column includes a spring, a shell, and an adjusting member, the spring is located in the shell, an end of the spring is pressed against an end of the shell, and another end of the spring is pressed against the adjusting member.

It is necessary to increase the initial pressure when adjusting the initial pressure of the spring, and the adjusting member is configured to move in a direction in which the spring is compressed to cause the compression of the spring, thereby increasing the initial pressure of the spring.

In an embodiment, the elastic column further includes an inner tube and a flexible wire, the shell is sleeved on the inner tube. The spring is located between the shell and the inner tube. The shell and the inner tube are connected by the flexible wire, so that a maximum length of a combination of the shell and the inner tube remains unchanged.

In an embodiment, the spring has an elastic coefficient of K; the initial pressure has a minimum value of Fmin, and the compression amount of the spring to be adjusted is Ln. According to the analysis of the pre-processing data, it is concluded that an actual initial pressure of one of the elastic columns is to be adjusted to Fn. According to a formulation Ln=(Fn−Fmin)/K, the compression amount Ln of the spring is calculated, and the adjusting member is caused to move by a distance Ln in the direction in which the spring is compressed. According to the above formulation and pre-processing data, each spring is adjusted to have a corresponding compression amount Ln.

In an embodiment, the weight collector provided with a height measuring rod configured to slide on the height measuring rod to measure the height of the human body when the subject stands on the weight collector.

The contour collector is configured to slide at bottom of the weight collector. The contour collector includes a measuring plate and a plurality of distance measuring columns distributed on the measuring plate. A protruding head is provided at the top of the distance measuring column. When the contour collector is pushed to press against the human body, the protruding head of the distance measuring column abuts on the human body, and the length of the distance measuring column is compressed. The measuring plate is divided into an area A and an area B, and the plurality of the distance measuring columns are arranged on the area A and the area B respectively.

The processing center includes a single-chip micro-computer circuit for distance measurement for the area A, a single-chip micro-computer circuit for distance measurement for the area B, and a single-chip micro-computer of the simulated bed;

The single-chip micro-computer circuit for distance measurement for the area A and the single-chip micro-computer circuit for distance measurement for the area B are set. Distance measurement circuit units of the area A are gated by a single-chip micro-computer U1 for the area A one by one. A distance measuring pulse is sent by a 36th pin of the single-chip micro-computer U1 for the area A and a return pulse is received by a 37th pin of the single-chip micro-computer U1 for the area A. The height of each distance measuring column for the area A is calculated. Distance measurement circuit units of the area B are gated by a single-chip micro-computer U2 for the area B one by one. A distance measuring pulse is sent by a 36th pin of the single-chip micro-computer U2 for the area B and a return pulse is received by the 37th pin of the single-chip micro-computer U2 for the area B. The height of each distance measuring column for the area B is calculated. A serial port 1 of the single-chip micro-computer U1 for the area A is connected to a serial port 1 of the single-chip micro-computer U2 for the area B, and the height data of all the distance measuring columns for the area A is transmitted to a memory U11 of the single-chip micro-computer U2 for the area B for storage.

A program module for chip-selecting the distance measuring column for the area A, a program module for initializing the distance measuring column for the area A, a program module for distance measurement for the area A, a program module for displaying distance measurement for the area A, a program module for communication with the area B, and a program module for keyboard management for the area A are loaded in an area A program memory of the single-chip micro-computer U1 for the area A, and each of the above program modules are able to be called and executed by an area A main processor. A program module for chip-selecting the distance measuring column for the area B, a program module for initializing the distance measuring column for the area B, a program module for distance measurement for the area B, a program module for displaying distance measurement for the area B, a program module for communication with the area A, a program module for keyboard management for the area B, a program module for unified storage, and a program module for communication with an elastic driven board are loaded in an area B program memory of the single-chip micro-computer U2 for the area B, and each of the above program modules are able to be called and executed by an area B main processor;

The elastic column includes a spring, and an initial pressure of a compression amount of the spring is adjusted by driving the spring with a motor. A program module for communication with the single-chip micro-computer of the simulated bed, a program module for pressure A/D conversion, a program module for motor driving, and a program module for self-detection are loaded in a U4 program memory of a single-chip micro-computer U4 for the elastic column, and each of the above program modules are able to be called and executed by a main processor of the simulated bed.

The simulated bed is provided with a pressure sensor IC6 at the bottom-most of the elastic column. A pressure sensing circuit is configured to output a pressure analog voltage V0 to a circuit for driving the pressure detecting motor of the elastic column. A pin of a port P1 of the single-chip micro-computer U4 for driving detection in the circuit is connected to the pressure analogy pressure V0. A motor is located on the pressure sensor IC6 in the elastic column, and a pressure transmitted through the motor is sensed by the pressure sensor IC6.

The motor is driven by the single-chip micro-computer U4 for driving detection to rotate positively and reversely, thereby controlling the initial pressure of the elastic column.

A chip MAX487 for a RS485 communication interface is provided in a circuit for driving the pressure detecting motor of the elastic column, and the chip MAX487 is connected to a serial port of the single-chip micro-computer U4 for driving detection and a serial port 2 of the single-chip micro-computer U3 of the simulated bed. A group of interfaces of the single-chip micro-computer U4 for driving detection is connected to a station number setting circuit constituted of DIP switches. When driving data of the station number is sent from the single-chip micro-computer U3 of the simulated bed, the single-chip micro-computer U4 for driving detection drives the motor to operate according to the driving data and the spring is pressed, and at the same time, a reverse pressure is applied on the sensor IC6, and the pressure sensing circuit outputs an increased pressure voltage V0. An A/D convertor inside the port P1 of the single-chip micro-computer U4 for driving detection converts an analogy voltage into digital data, and after comparison, when the external data and the local A/D conversion data are approximate each other, the motor stops operating.

When the initial pressure of all the elastic columns have been set, an elasticity display unit connected to the single-chip micro-computer U3 of the simulated bed displays a setting status of the initial pressure of each elastic column, and at this time, the subject experiences comfortability on the simulated bed and makes an improvement requirement subjectively; at this time, improvement data is input through an elasticity command keyboard circuit and an elasticity data keyboard circuit, and the initial pressure of the elastic column in the relevant part is changed until the subject is satisfied, and the final data is recorded and stored in the SD card.

According to another aspect of the present disclosure, a system for collecting prone position data of a human body is provided. The system includes: a weight collector, configured to collect weight data of a subject; a contour collector, configured to collect back contour data of the subject, at least one of the weight collector or the contour collector being provided with a height collection function for collecting height data of the subject; a console, having a processing center located therein and configured to receive the weight data, the back contour data, and the height data and pre-process the weight data, the back contour data, and the height data received to form pre-processing data; and a simulated bed, configured to adjust an elastic column to a specified initial pressure according to the pre-processing data to provide the subject with comfortability.

The technical solutions provided by the present disclosure have the following advantages and effects.

The weight data and contour data of the subject are collected with the weight collector and the contour collector, and the height data of the subject is also collected at the same time. Such data is pre-processed at the processing center after obtained. Then the data is received by the simulated bed to adjust the initial pressure of the elastic column. The initial pressure of the adjusted elastic column will be different in different positions. For example, for the human buttock position, the elastic column is compressed more when lying down, and in this case, the initial pressure of the elastic column of this part should be set to be smaller. And for the human waist position, the compression amount of the elastic column is small when lying down. Therefore, in order to ensure that the strength sustained by each elastic column is similar after the subject lies down, the initial pressure of the waist position is adjusted to be greater, and the initial pressure of the buttock position is adjusted to be smaller, so that the pressure of each part of the body is similar after the subject lies down. Then, an adjustment is performed according to the subjective experience of the subject to reach a hardness/softness suitable for the subject. Then, personalized mattress data is stored. The personalized mattress data at this time is sent to a factory for processing.

BRIEF DESCRIPTION OF THE DRAWINGS

The accompanying drawing herein shows specific example of the technical solution of the present disclosure, and constitutes a part of the specification with the specific implementations to explain the technical solution, principle, and effect of the present disclosure.

Unless specified or defined otherwise, the same reference numeral represents the same or similar technical feature in different accompanying drawing, and different reference numeral may be used to represent the same or similar technical feature.

DESCRIPTION OF THE REFERENCE NUMERAL

Figure 1:
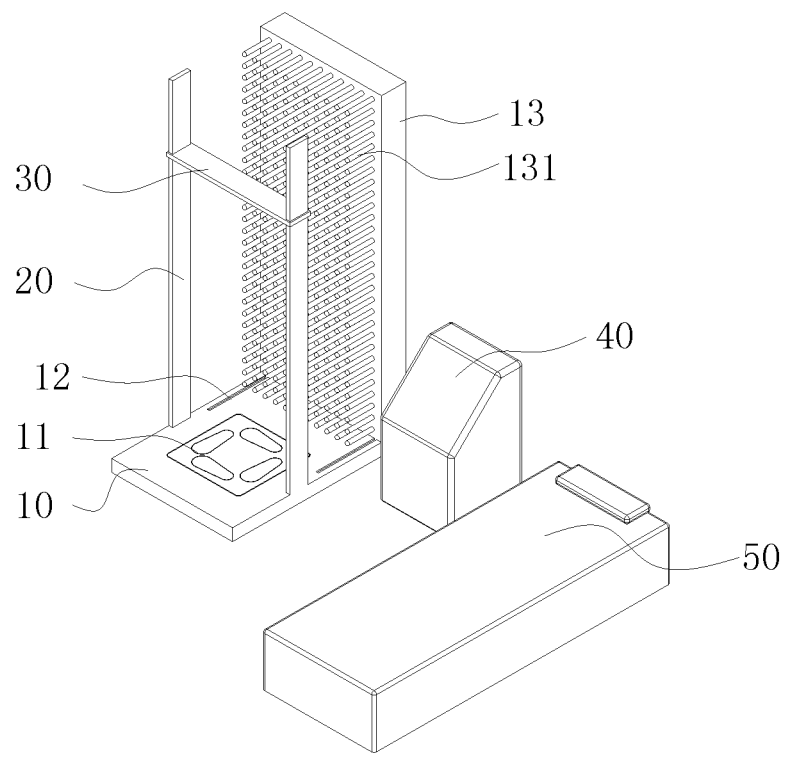
FIG. 1 is a perspective diagram illustrating a system according to an embodiment of the present disclosure.

10: weight collector; 11: weighing platform; 12: slideway; 13: measuring plate; 131: distance measuring column; 20: height measuring rod; 30: height measuring plate; 31: distance measurement circuit unit; 32: base tube; 33: ultrasonic wave generator; 34: ultrasonic wave receiver; 35: reflecting surface; 36: groove; 37: elastic buckle; 38: position limitation buckle; 39: protruding head; 391: hook hole; 40: console; 50: simulated bed; 51: receiving plate; 521: spring; 522: shell; 523: adjusting member; 5231: motor; 5232: screw; 5233: threaded plate; 524: inner tube; 525: flexible wire; and 53: housing.

DETAILED DESCRIPTION

In order to facilitate the understanding of the present disclosure, specific embodiment of the present disclosure will be described in further detail below with reference to the accompanying drawings in the specification.

Unless the context indicates otherwise, all the technical and scientific terms used herein have the same meaning as commonly understood by the skilled people in the art. In the case of combining the technical solution of the present disclosure and the realistic scenario, all the technical and scientific terms used herein can also have meanings corresponding to the purpose of realizing the technical solution of the present disclosure.

Although the terms first, second, etc. may be used herein to describe various elements, these elements should not be limited by these terms, unless the context indicates otherwise. These terms are only used to distinguish one element from another. For example, a first element could be termed a second element, and, similarly, a second element could be termed a first element, without departing from the scope of example embodiments.

As used herein, the term "and/or" includes any and all combinations of one or more of the associated listed items.

It should be noted that when an element is referred to as being "fixed" to another element, it may be directly fixed to the other element or intervening elements may be present. When an element is referred to as being "connected" to another element, it may be directly connected to the other element or intervening elements may be present. When an element is referred to as being "disposed" on another element, it may be directly disposed on the other element or intervening elements may be present. When an element is referred to as being "provided" on another element, it may be directly provided on the other element or intervening elements may be present.

As shown in FIGS. 1 to 7, a system for collecting prone position data of a human body includes: a weight collector 10, configured to collect weight data of a subject; a contour collector, configured to collect back contour data of a subject, at least one of the weight collector 10 or the contour collector being provided with a height collection function for collecting height data of the subject; a console 40, having a processing center located therein and configured to receive the weight data, the back contour data, and the height data and pre-process the weight data, the back contour data, and the height data received to form pre-processing data; and a simulated bed 50, configured to adjust an elastic column 52 to a specified initial pressure according to the pre-processing data to provide the subject with comfortability.

Specifically in this embodiment, a height collector includes a height measuring rod 20 and a height measuring plate 30. The height measuring rod 20 is mounted on the weight collector 10. The height measuring plate 30 is movable on the height measuring rod 20 to contact the head of the subject and implement height measurement. The weight collector 10 has been integrated with the contour collector, and the data collection by the contour collector can be realized after the subject stands on the weight collector 10. An upper surface on the height collector has a weighing platform 11 and a slideway 12 cooperated with the contour collector.

The contour collector includes a measuring plate 13 and a plurality of distance measuring columns 131 distributed on the measuring plate 13.

The simulated bed 50 includes an elastic column 52, a receiving plate 51, and a housing 53. The elastic column 52 is mounted on the receiving plate 51 and covered by the housing 53. The elastic column 52 includes a spring 521, a shell 522, an inner tube 524, a flexible wire 525, and an adjusting member 523. The spring 521 is located inside the shell 522, an end of the spring 521 is pressed against an end of the shell 522 and another end of the spring is pressed against the adjusting member 523. Specifically, the shell 522 is sleeved on the outside of the inner tube 524 which can extend into the shell 522, and the spring 521 is located inside the shell 522 and the inner tube 524. The adjusting member 523 includes a motor 5231, a screw 5232, and a threaded plate 5233. The screw 5232 is driven to rotate by the motor 5231 and the threaded plate 5233 moves along with the screw 5232. A rotation is controlled clockwisely or counterclockwisely through the motor 5231 to realize upward or downward movement of the threaded plate 5233, that is, the spring 521 can be compressed when the threaded plate 5233 moves upward and the spring 521 can be released when the threaded plate 5233 moves downward.

As shown in FIGS. 1 to 7, the method for collecting prone position data of a human body includes the following steps.

The subject is caused to stand on the weight collector 10 and weight data of the subject is collected by the weight collector 10.

The subject is caused to stand and back contour data of the subject is collected by the contour collector;

Height data of the subject is collected by the weight collector 10 or the contour collector;

The weight data, the back contour data, and the height data is received by the processing center. The processing center pre-preprocesses the weight data, the back contour data, and the height data, and sends the pre-processed pre-processing data to the simulated bed 50.

The pre-processing data is received and an initial pressure of a plurality of elastic columns 52 of the simulated bed 50 is adjusted according to the pre-processing data by the simulated bed 50.

The subject is caused to lie on the adjusted simulated bed 50 and the simulated bed 50 is adjusted according to the subjective description of the subject until the simulated bed 50 is suitable for the subject.

Adjustment data of the simulated bed 50 suitable for the subject is collected by the processing center.

Figure 4:
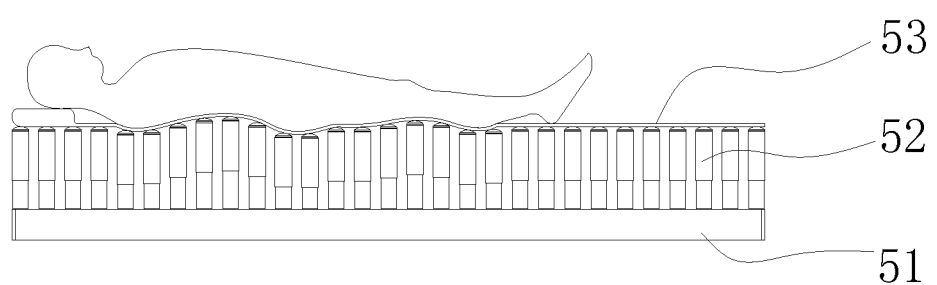
FIG. 4 is a structure diagram illustrating a simulated bed according to an embodiment of the present disclosure with a subject lying on the simulated bed.

The weight data and the contour data of the subject is collected with the weight collector 10 and the contour collector, and the height data of the subject is also collected at the same time. Such data is pre-processed at the processing center after obtained. Then the data is received by the simulated bed 50 to adjust the initial pressure of the elastic column 52. As shown in FIG. 4, the initial pressure of the adjusted elastic column 52 will be different in different positions. For example, for the human buttock position, the elastic column 52 is compressed more when lying down, and in this case, the initial pressure of the elastic column 52 of this part should be set to be smaller; and the human waist position, the compression amount of the elastic column 52 is small when lying down. Therefore, in order to ensure that the strength sustained by each elastic column 52 is similar after the subject lies down, the initial pressure of the waist position is adjusted to be greater, and the initial pressure of the buttock position is adjusted to be smaller, so that the pressure of each part of the body is similar after the subject lies down. Then, an adjustment is performed according to the subjective experience of the subject to reach a hardness/softness suitable for the subject. Then, personalized mattress data is stored. The personalized mattress data at this time is sent to a factory for processing.

Figure 2:
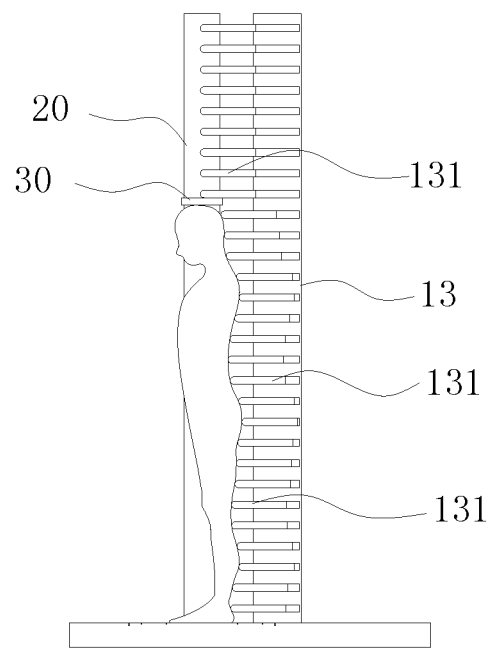
FIG. 2 is a schematic diagram illustrating data collection according to an embodiment of the present disclosure.
Figure 3:
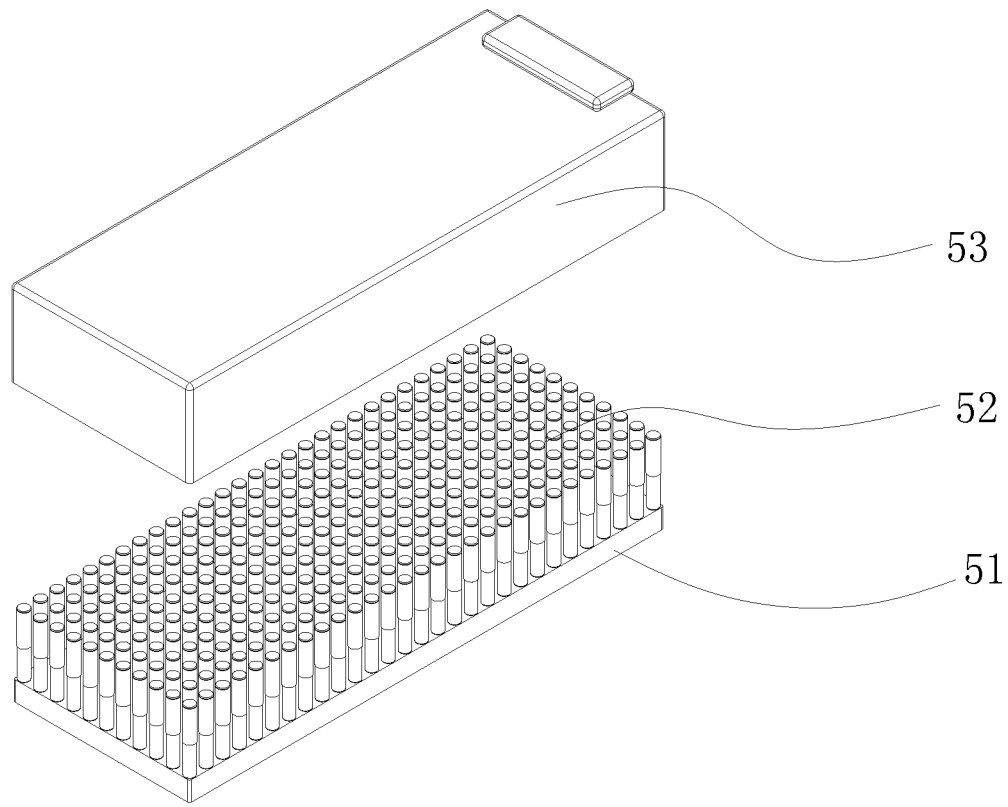
FIG. 3 is an exploded perspective diagram illustrating a simulated bed according to an embodiment of the present disclosure.

As shown in FIG. 1 and FIG. 2, the weight collector 10 is integrated with the contour collector. The height data is collected while collecting the weight data of the subject. The back contour data is also collected in the contour collector.

The measuring plate 13 moves relative to a standing plate of the subject, and the distance measuring column 131 is in contact with the back of the subject. The measuring plate 13 stops moving after moving to a preset position, and the contour collector obtains position data of the distance measuring column 131 in a compressed state. The data collected at this time is the data of the back contour of the subject, that is, the personalized data of the human body.

Further, the measuring plate 13 moves to the back of the subject. The distance measuring columns 131 are gradually in contact with a back contour of the subject and compressed until one of the distance measuring columns 131 is compressed at a maximum compression amount, and the measuring plate stops moving. At this time, all the distance measuring columns 131 are in contact with the subject's body within a range of a front projection of the subject's body, and the contour collector obtains the position data of the distance measuring column 131. After the maximum compression amount is reached, the measuring plate 13 stops moving to ensure that the back contour of the human body is completely in contact with the distance measuring column 131, and the data collected is more accurate.

The pre-processing the data by the processing center includes: calculating a distribution of the weight of the subject according to the weight data, the back contour data, and the height data. The distribution of the weight can provide data support for the subsequent adjustment of the elastic column 52 on the simulated bed 50.

It is necessary to increase the initial pressure when adjusting the initial pressure of the spring 521. The adjusting member 523 is configured to move in a direction in which the spring 521 is compressed to cause the compression of the spring 521, thereby increasing the initial pressure of the spring 521. Because different parts has different degrees of depression when the human body is in the lateral position, the initial pressure of the elastic column 52 is adjusted through adjusting the compression amount of the spring 521 to satisfy that the pressure of each part is balanced when the human body is in the lateral position.

The elastic column 52 further includes the inner tube 524 and the flexible wire 525. The shell 522 is sleeved on the inner tube 524; the spring 521 is inside the shell 522 and the inner tube 524. The shell 522 and the inner tube 524 are connected by the flexible wire 525, which causes the maximum length of a combination of the shell 522 and the inner tube 524 remains unchanged. This arrangement is to ensure that the maximum dimension of the elastic column 52 remains unchanged, and hence the surface of the simulated bed 50 is flat in a natural state.

Figure 5:
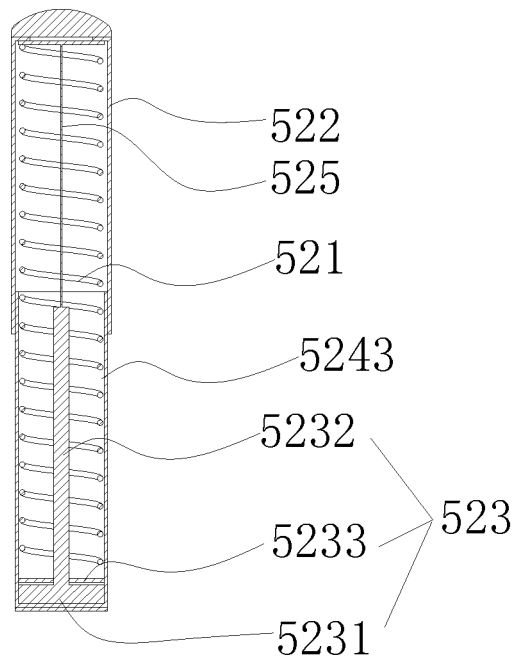
FIG. 5 is a cross-sectional diagram illustrating an elastic column with a minimum initial pressure according to an embodiment of the present disclosure.
Figure 6:
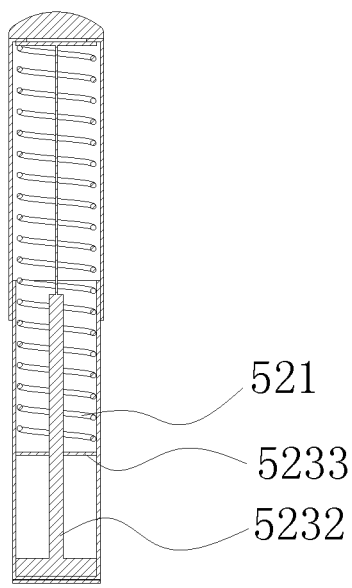
FIG. 6 is a cross-sectional diagram illustrating an elastic column with a adjusted initial pressure according to an embodiment of the present disclosure.
Figure 7:
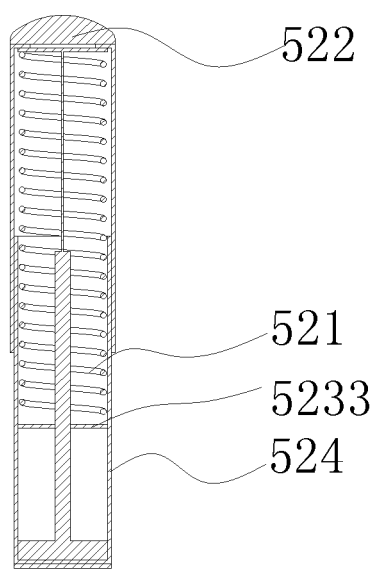
FIG. 7 is a cross-sectional diagram illustrating an elastic column in FIG. 6 when being pressed according to an embodiment of the present disclosure.
Figure 8:
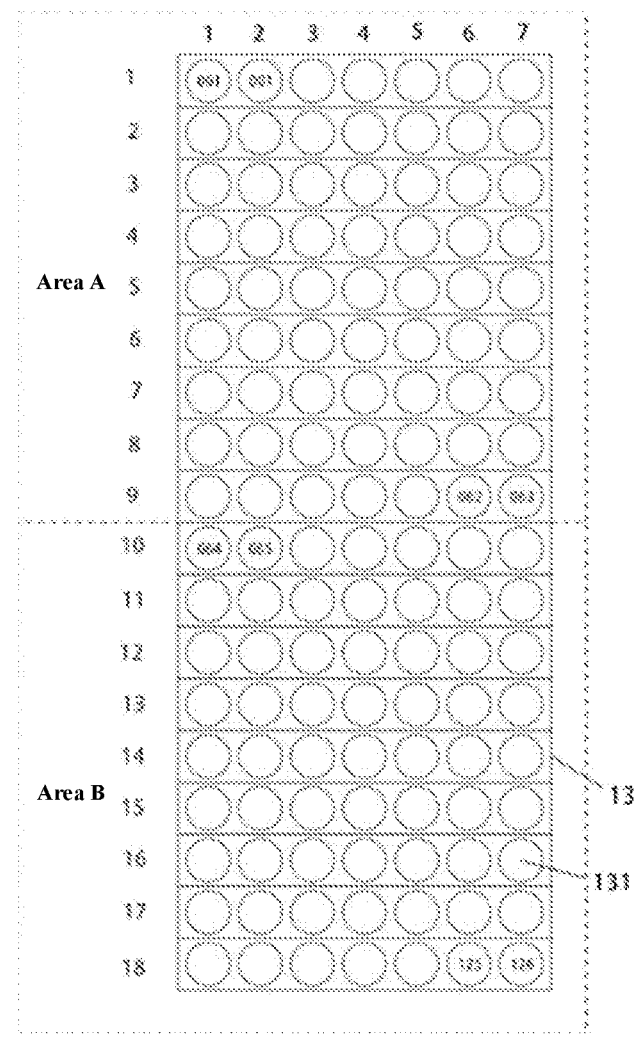
FIG. 8 is a schematic diagram illustrating partitions of a contour collector according to an embodiment of the present disclosure.
Figure 9:
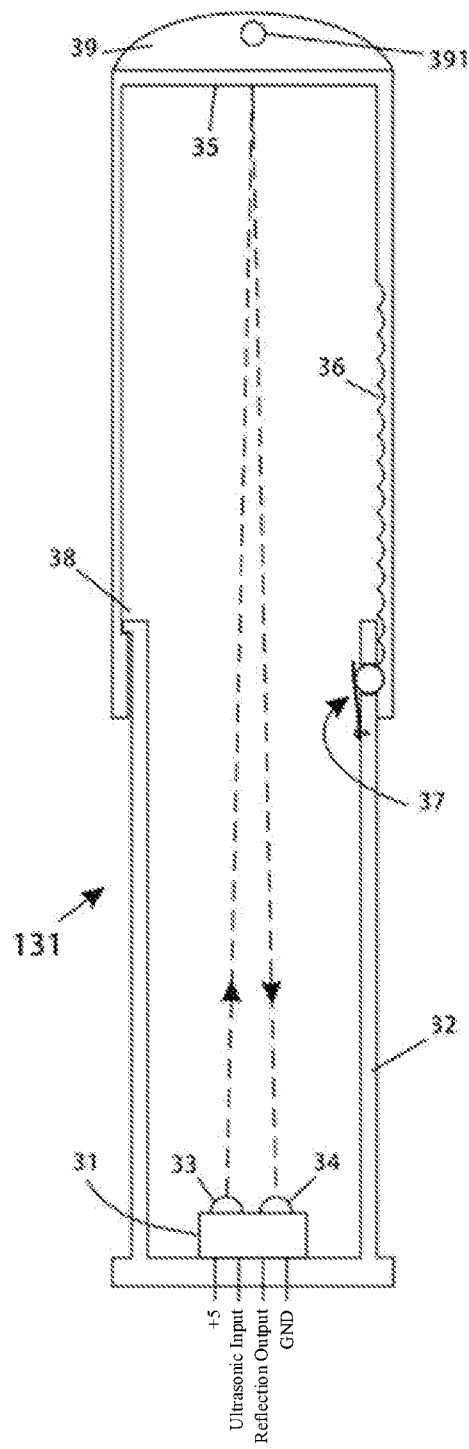
FIG. 9 is a schematic diagram illustrating an internal structure of a distance measuring column according to an embodiment of the present disclosure.
Figure 10:
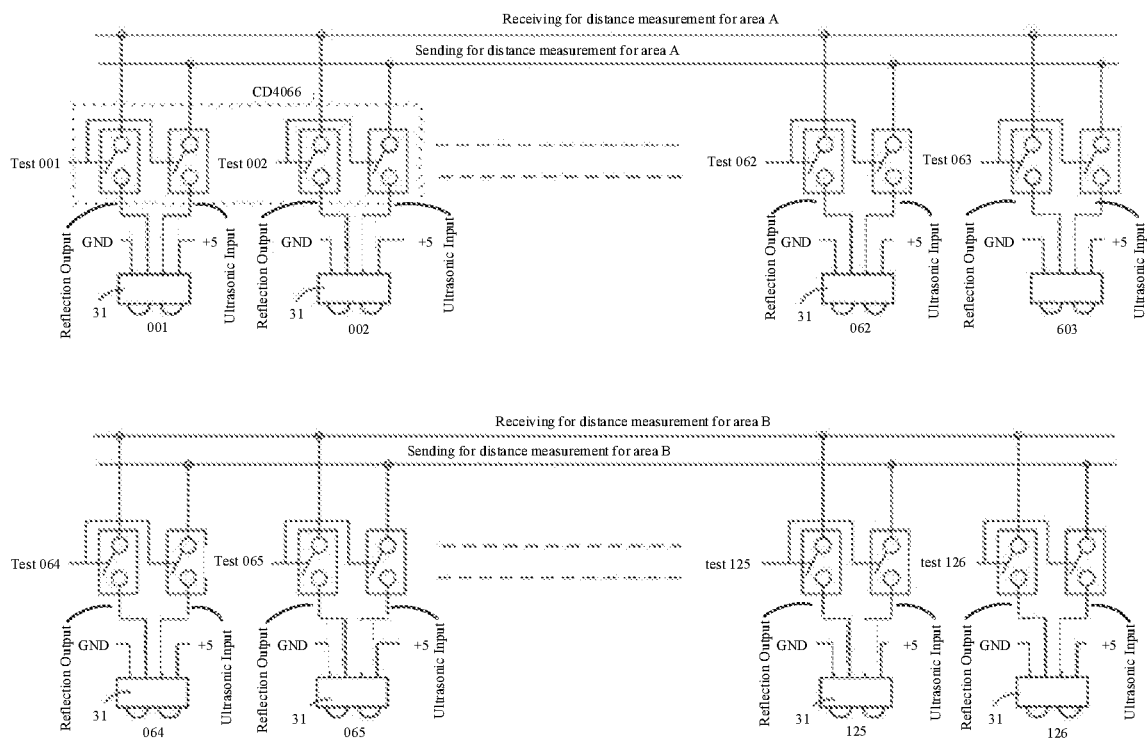
FIG. 10 is a structure diagram illustrating a circuit for a distance measuring column according to an embodiment of the present disclosure.
Figure 11:
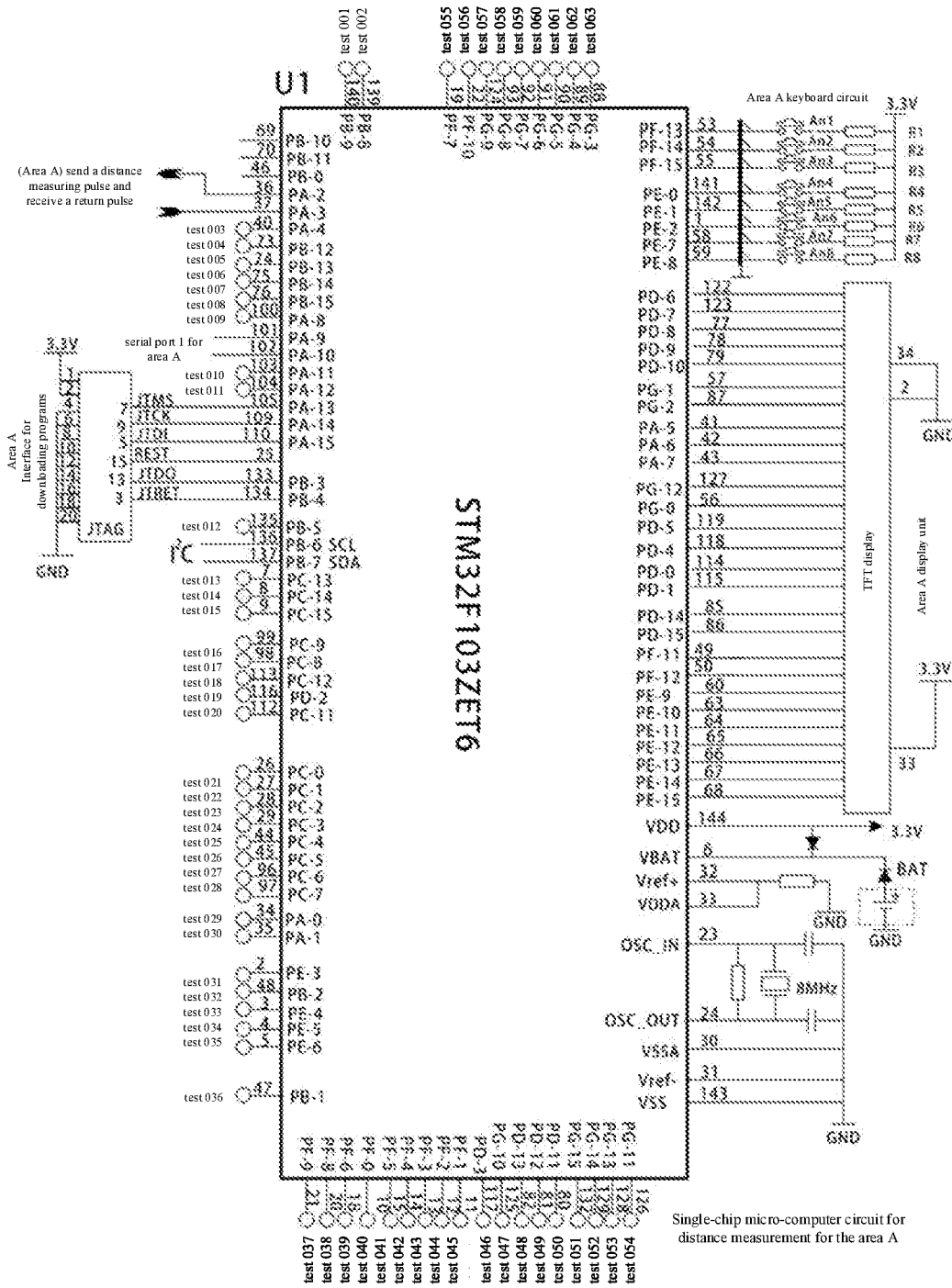
FIG. 11 is a schematic diagram illustrating a principle of a single-chip micro-computer U1 for the area A according to an embodiment of the present disclosure.
Figure 12:
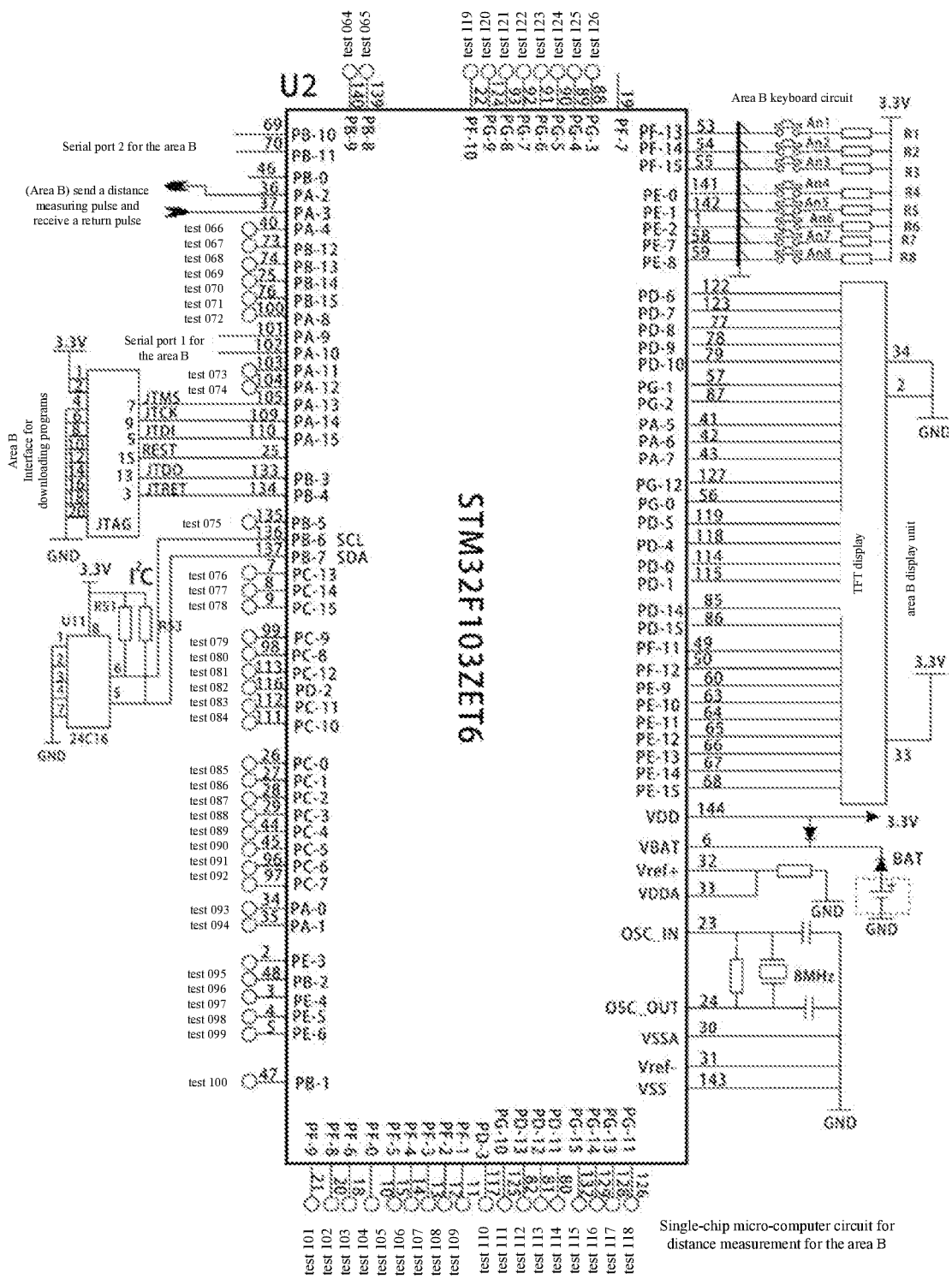
FIG. 12 is a schematic diagram illustrating a principle of a single-chip micro-computer U2 for the area B according to an embodiment of the present disclosure.
Figure 13:
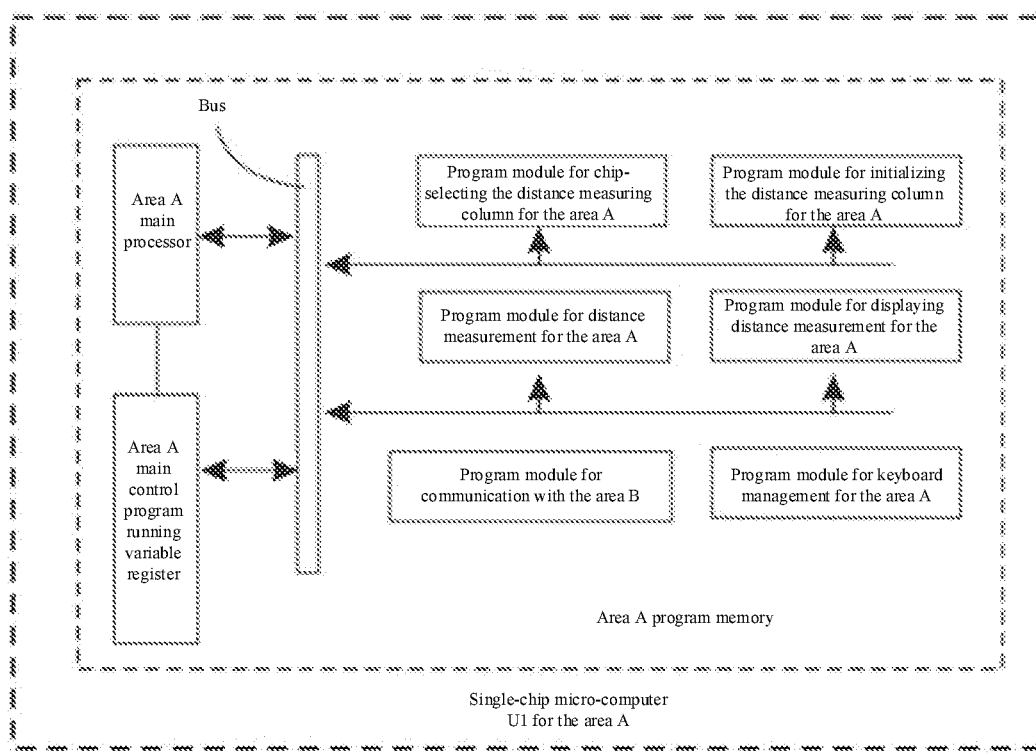
FIG. 13 is a block diagram illustrating programs for the area A according to an embodiment of the present disclosure.
Figure 14:
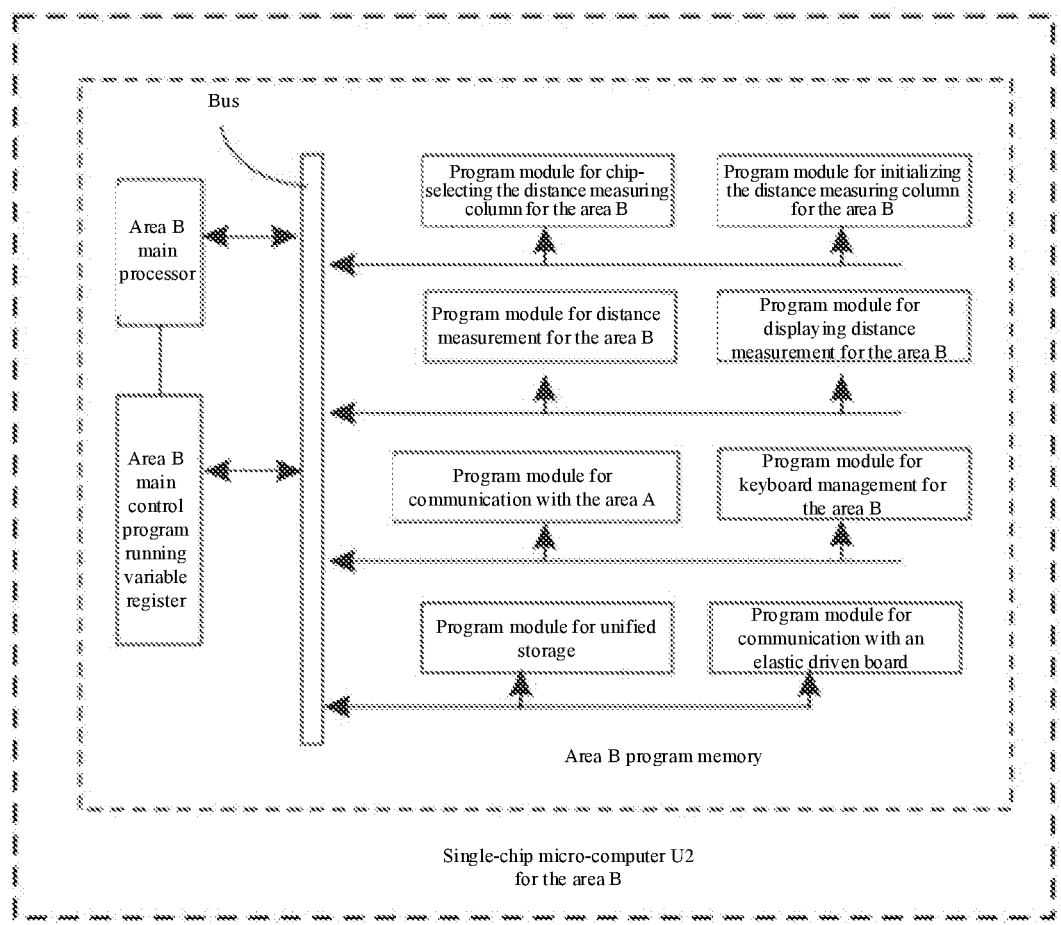
FIG. 14 is a block diagram illustrating programs for the area B according to an embodiment of the present disclosure.
Figure 15:
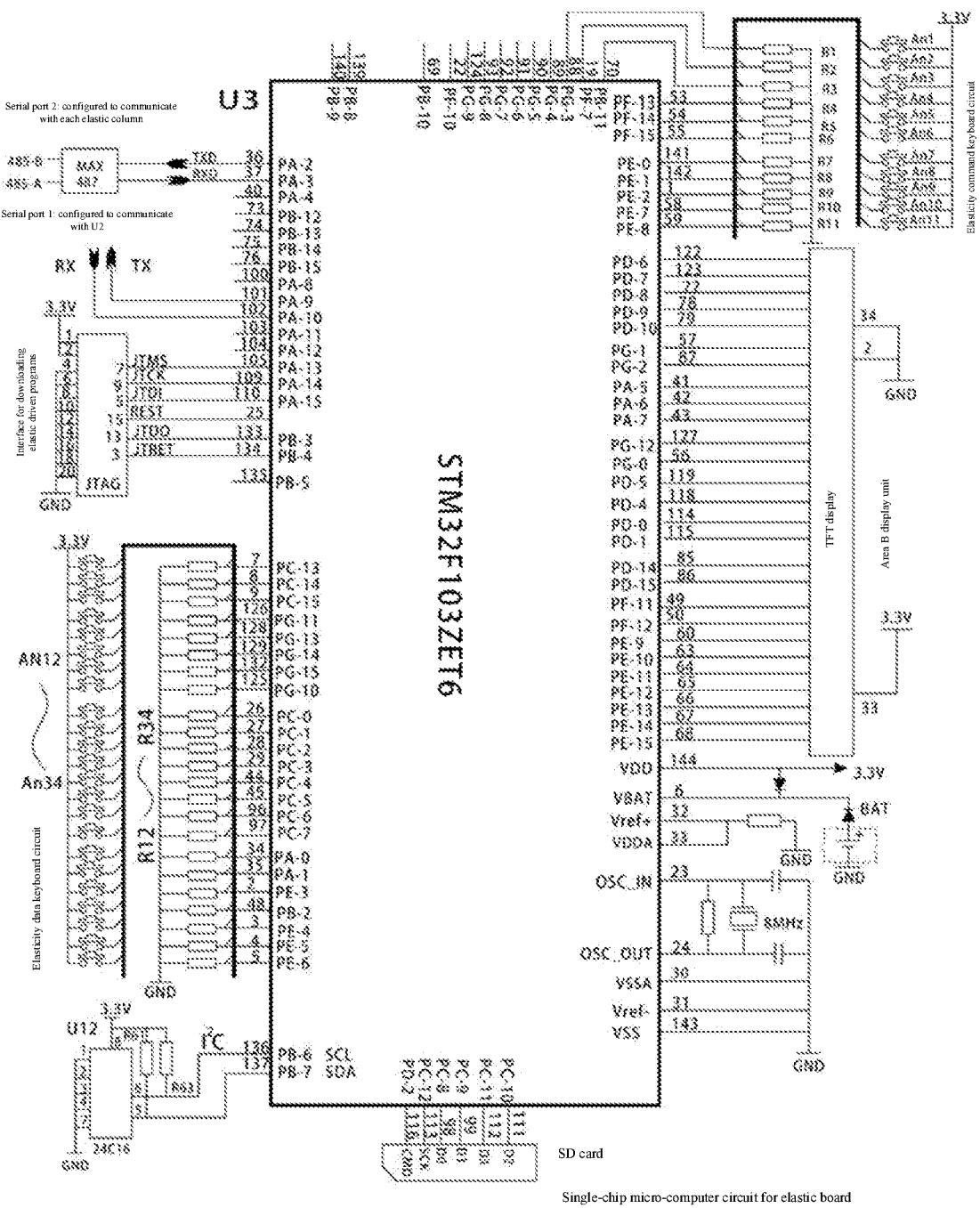
FIG. 15 is a schematic diagram illustrating a principle of a circuit for a simulated bed according to an embodiment of the present disclosure.
Figure 16:
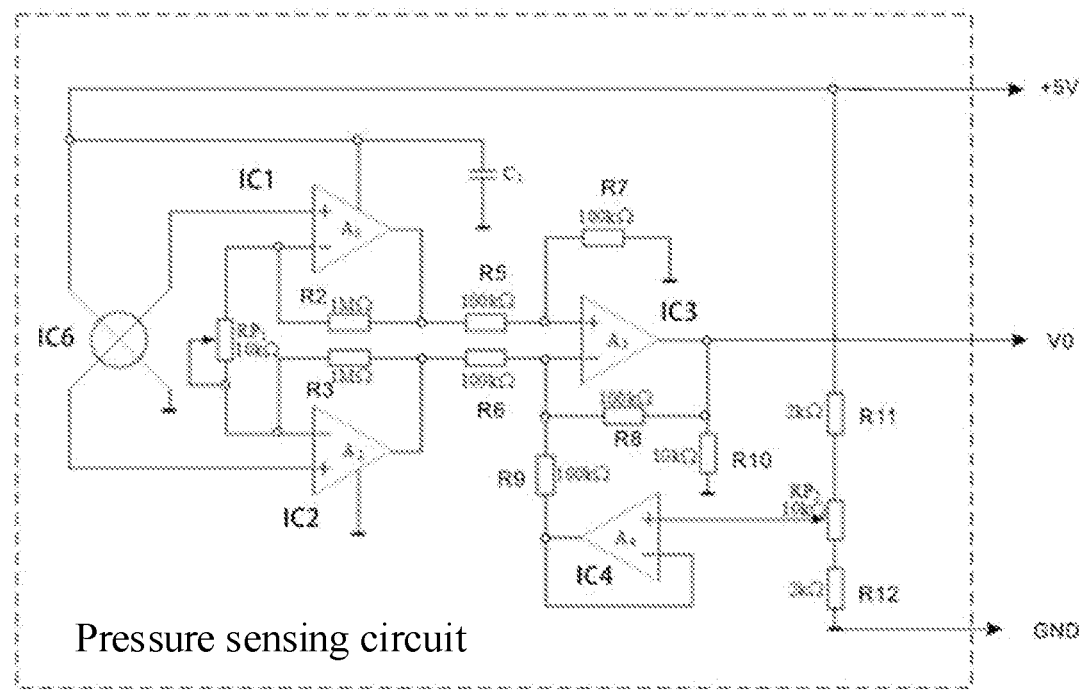
FIG. 16 is an enlarged diagram illustrating a pressure sensing circuit according to an embodiment of the present disclosure.
Figure 17:
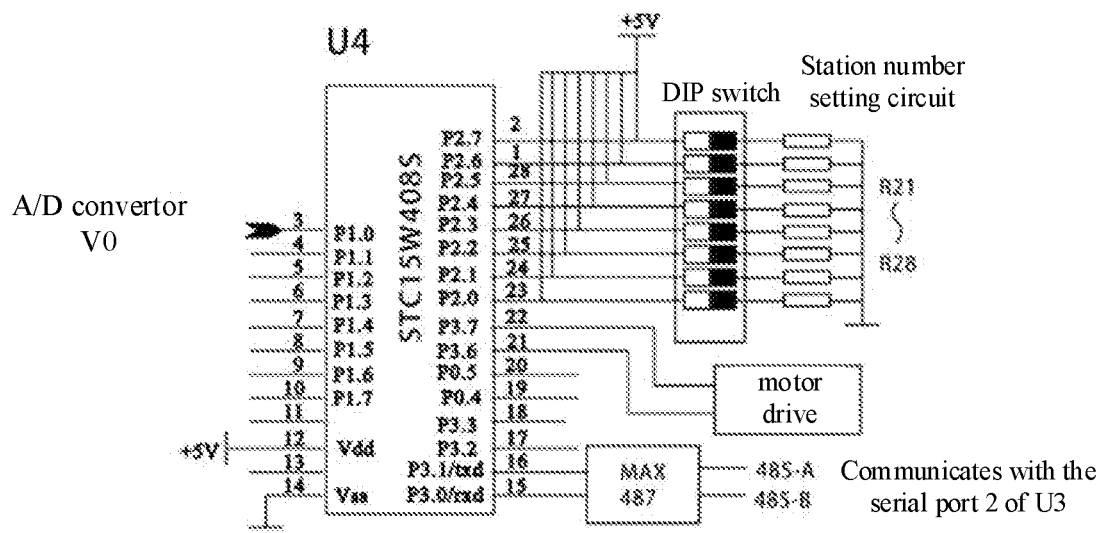
FIG. 17 is a schematic diagram illustrating a principle of a circuit for driving motor according to an embodiment of the present disclosure.
Figure 18:
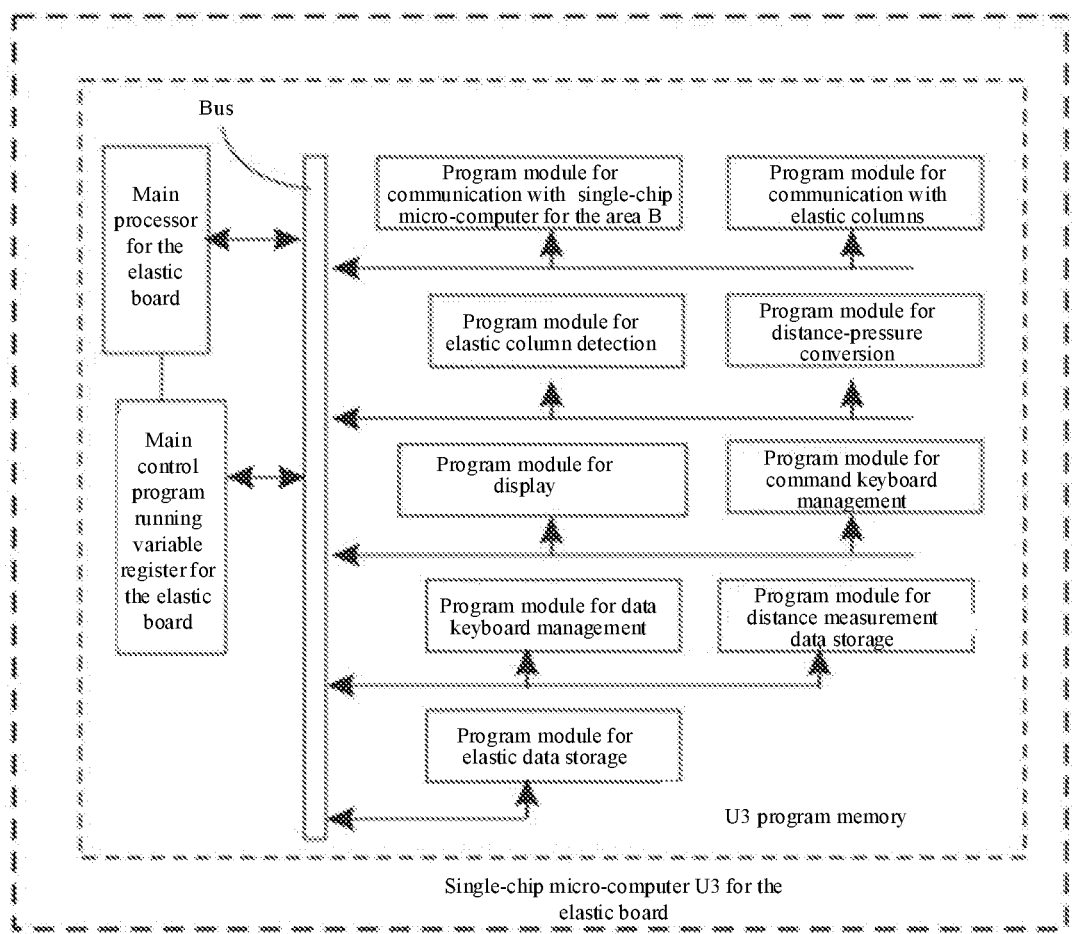
FIG. 18 is a block diagram illustrating programs for a single-chip micro-computer U3 according to an embodiment of the present disclosure.
Figure 19:
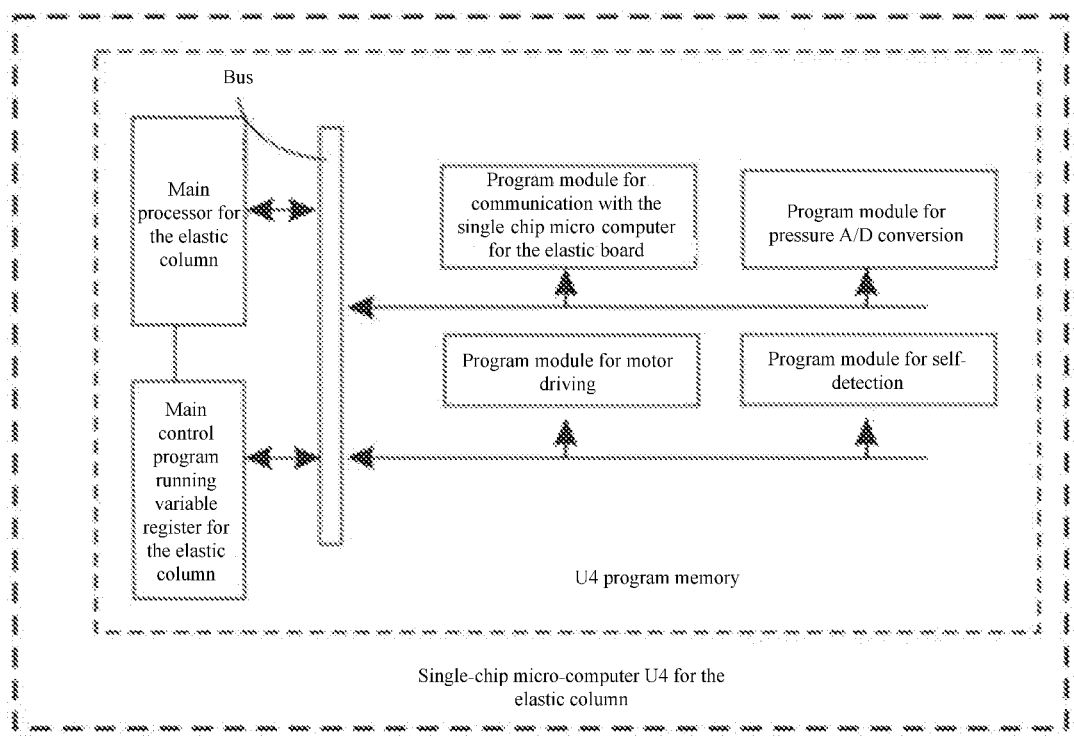
FIG. 19 is a block diagram illustrating programs for a single-chip micro-computer U4 according to an embodiment of the present disclosure.

As shown in FIGS. 4 to 5, the specific strength adjustment of the elastic column 52 is illustrated. The elastic coefficient of the spring 521 is K, the initial pressure has a minimum value of Fmin, and the compression amount of the spring 521 to be adjusted is Ln. According to the analysis of the pre-processing data, it is concluded that the actual initial pressure of one of the elastic columns 52 should be adjusted to Fn. According to the formulation Ln=(Fn−Fmin)/K, the compression amount Ln of the spring 521 is calculated, and the adjusting member 523 is caused to move by a distance Ln in the direction in which the spring 521 is compressed. According to the above formulation and pre-processing data, each spring 521 is adjusted to have a corresponding compression amount Ln. At this time, the spring 521 is compressed by the length of Ln by the adjusting member 523, which satisfies the adjustment of the specified elastic column 52. The specified actual initial pressure of the other different elastic column 52 is adjusted according to the pre-processing data.

Specifically, refer to FIGS. 8 to 19. The contour collector slides at the bottom of the weight collector 10. The contour collector includes the measuring plate 13 and the plurality of the distance measuring columns 131 distributed on the measuring plate 13. A protruding head 39 is provided at the top of the distance measuring column 131. When the contour collector is pushed to press against the human body, the protruding head 39 of the distance measuring column 131 abuts on the human body, and the length of the distance measuring column 131 is compressed. The measuring plate 13 is divided into an area A and an area B, and the plurality of the distance measuring columns 131 are arranged on the area A and the area B respectively.

The processing center includes a single-chip micro-computer circuit for distance measurement for the area A, a single-chip micro-computer circuit for distance measurement for the area B, and a single-chip micro-computer of the simulated bed 50.

The single-chip micro-computer circuit for distance measurement for the area A and the single-chip micro-computer circuit for distance measurement for the area B are set. Distance measurement circuit units 31 of the area A are gated by a single-chip micro-computer U1 for the area A one by one. A distance measuring pulse is sent by the 36th pin of the single-chip micro-computer U1 for the area A and a return pulse is received by a 37th pin. The height of each distance measuring column 131 for the area A is calculated. Distance measurement circuit units 31 of the area B are gated by a single-chip micro-computer U2 for the area B one by one. A distance measuring pulse is sent by a 36th pin of the single-chip micro-computer U2 for the area B and a return pulse is received by a 37th pin of the single-chip micro-computer U2 for the area B. The height of each distance measuring column 131 for the area B is calculated. A serial port 1 of the single-chip micro-computer U1 for the area A is connected to a serial port 1 of the single-chip micro-computer U2 for the area B, and the height data of all the distance measuring columns 131 for the area A is transmitted to a memory U11 of the single-chip micro-computer U2 for the area B for storage.

A program module for chip-selecting the distance measuring column 131 for the area A, a program module for initializing the distance measuring column 131 for the area A, a program module for distance measurement for the area A, a program module for displaying distance measurement for the area A, a program module for communication with the area B, and a program module for keyboard management for the area A are loaded in an area A program memory of the single-chip micro-computer U1 for the area A, and each of the above program modules are able to be called and executed by an area A main processor. A program module for chip-selecting the distance measuring column 131 for the area B, a program module for initializing the distance measuring column 131 for the area B, a program module for distance measurement for the area B, a program module for displaying distance measurement for the area B, a program module for communication with the area A, a program module for keyboard management for the area B, a program module for unified storage, and a program module for communication with an elastic driven board are loaded in an area B program memory of the single-chip micro-computer U2 for the area B, and each of the above program modules are able to be called and executed by an area B main processor.

The elastic column 52 includes the spring 521, and the initial pressure of the compression amount of the spring 521 is adjusted by driving the spring with a motor 5231. A program module for communication with the single-chip micro-computer of the simulated bed 50, a program module for pressure A/D conversion, a program module for motor driving 5231, and a program module for self-detection are loaded in a U4 program memory of a single-chip micro-computer U4 for the elastic column 52, and each of the above program modules are able to be called and executed by a main processor of the simulated bed 50.

The simulated bed 50 is provided with a pressure sensor IC6 at the bottom-most of the elastic column 52. A pressure sensing circuit outputs a pressure analog voltage V0 to a circuit for driving the pressure detecting motor 5231 of the elastic column 52. A pin of a port P1 of the single-chip micro-computer U4 for driving detection in the circuit is connected to the pressure analogy pressure V0. A motor 5231 is located on the pressure sensor IC6 in the elastic column 52, and a pressure transmitted through the motor 5231 is sensed by the pressure sensor IC6.

The motor 5231 is driven by the single-chip micro-computer U4 for driving detection to rotate positively and reversely, thereby controlling the initial pressure of the elastic column 52.

A chip MAX487 for a RS485 communication interface is provided in a circuit for driving the pressure detecting motor 5231 of the elastic column 52, and the chip MAX487 is connected to a serial port of the single-chip micro-computer U4 for driving detection and a serial port 2 of the single-chip micro-computer U3 of the simulated bed 50. A group of interfaces of the single-chip micro-computer U4 for driving detection is connected to a station number setting circuit constituted of DIP switches. When driving data of the station number is sent from the single-chip micro-computer U3 of the simulated bed 50, the single-chip micro-computer U4 for driving detection drives the motor 5231 to operate according to the driving data and the spring 521 is pressed. At the same time, a reverse pressure is applied on the sensor IC6, and the pressure sensing circuit outputs an increased pressure voltage V0. An A/D convertor inside the port P1 of the single-chip micro-computer U4 for driving detection converts an analogy voltage into digital data. After comparison, when the external data and the local A/D conversion data are approximate each other, the motor 5231 stops operating.

When the initial pressure of all the elastic columns 52 have been set, an elasticity display unit connected to the single-chip micro-computer U3 of the simulated bed 50 displays a setting status of the initial pressure of each elastic column 52. At this time, the subject experiences the comfortability on the simulated bed 50 and makes an improvement requirement subjectively. At this time, improvement data is input through an elasticity command keyboard circuit and an elasticity data keyboard circuit, and the initial pressure of the elastic column 52 in the relevant part is changed until the subject is satisfied, and the final data is recorded and stored in the SD card.

The gating the distance measurement circuit units 31 for the area A by the single-chip micro-computer U1 for the area A one by one and gating the distance measurement circuit units 31 for the area B by the single-chip micro-computer U2 for the area B one by one are implemented by constructing a gating circuit by an analog switch CD4066. Control points of test 001 to test 063 are gated by the single-chip micro-computer U1 for the area A and control points of test 064 to test 126 are gated by the single-chip micro-computer U2.

The distance measuring column 131 has a base tube 32. There is an elastic buckle 37 located between the base tube 32 and the upper column tube to maintain the compression degree. The depth of the compression is determined by how much a groove 36 is set. The upper column tube is sleeved on the base tube 32 and slides up and down; there is a position limitation groove between the upper column tube and the base tube 32 which prevents it from rotating left and right. A position limitation buckle 38 ensures that the upper column tube and the base tube 32 cannot fall off.

The protruding head 39 is curved, which makes contact with the human body comfortably, and a hook hole 391 is configured to reset the upper column tube manually.

A reflecting surface 35 is configured to reflect an ultrasonic wave emitted by an ultrasonic wave generator 33. After an ultrasonic wave receiver 34 receives a ultrasonic pulse train, the distance measurement circuit unit 31 transmits a signal back to the 37th pin of the single-chip micro-computer U1 for the area A or the single-chip micro-computer U2 for the area B, and the height of the distance measuring column 131 is calculated. A distance measuring pulse is emitted from the 36th pin.

The height of only one distance measuring column 131 can be detected each time the single-chip micro-computer U1 for the area A or the single-chip micro-computer U2 for the area B emits the distance measuring pulse from the 36th pin, hence sixty-three distance measuring columns 131 need to be detected in sequence. The chip-selecting is implemented by the digital circuit chip CD4066. An I/O pin of the single-chip micro-computer U1 for the area A or the single-chip micro-computer U2 for the area B outputs a high level, and a control end connected to the pin turns on a connection between the distance measuring column 131 gated and the 36th pin of the single-chip micro-computer. The measurement of the distance measuring column 131 is completed by the single-chip micro-computer U1 for the area A or the single-chip micro-computer U2 for the area B, and the distance measuring data is stored in a memory temporarily. The distance measuring column 131 and the single-chip micro-computer U1 for the area A or the single-chip micro-computer U2 for the area B is turned off, then a next I/O pin of the single-chip micro-computer U1 for the area A or the single-chip micro-computer U2 for the area B is turned on to output the high level, and the distance measurement is performed on the next distance measuring column 131.

When the drawing is cited for description, it is to explain the new feature. In order to avoid the description not concise enough caused by repeated citing of the drawing, the drawing will not be cited for the described feature one by one when the description is clear.

The purpose of the above embodiments is to exemplarily reproduce and derive the technical solution of the present disclosure, and to describe the technical solution, purpose, and effect of the present disclosure completely. The purpose is to make the public understand the disclosure of the present disclosure more thoroughly and completely, and the protection scope of the present disclosure is not limited herein.

The embodiments above are also not an exhaustive list based on the present disclosure. In addition, there may also be many other embodiments that are not listed. Any replacement and improvement made on the basis not violating the concept of the present disclosure shall fall within the protection scope of the present disclosure.

The invention claimed is:

1. A method for collecting prone position data of a human body, comprising:
   causing a subject to stand on a weight collector, and collecting weight data of the subject with the weight collector;
   causing the subject to stand, and collecting back contour data of the subject with a contour collector, wherein the contour collector includes a measuring plate and a plurality of distance measuring columns distributed on the measuring plate, the measuring plate is movable relative to a standing plate of the subject, the measuring plate is configured to stop moving after moving to a preset position, and the contour collector is configured to obtain position data of the distance measuring column in a compressed state;
   collecting height data of the subject by the weight collector or the contour collector;
   receiving the weight data, the back contour data, and the height data, pre-preprocessing the weight data, the back contour data, and the height data, and sending the pre-processed pre-processing data to a simulated bed by a processing center;
   receiving the pre-processing data and adjusting an initial pressure of a plurality of elastic columns of a simulated bed according to the pre-processing data by the simulated bed;
   causing the subject to lie on the adjusted simulated bed and further adjusting the simulated bed until the simulated bed is suitable for the subject; and
   collecting adjustment data of the simulated bed suitable for the subject by the processing center.

2. The method for collecting the prone position data of the human body according to claim 1, wherein the weight collector is integrated with the contour collector, the weight data of the subject is collected while the height data is also collected, and the back contour data is also collected in the contour collector.

3. The method for collecting the prone position data of the human body according to claim 1, wherein:
the measuring plate is configured to move to the back of the subject, so that the distance measuring columns are gradually in contact with a back contour of the subject and compressed, and configured to stop moving when one of the distance measuring columns is compressed at a maximum compression amount; and
all the distance measuring columns are in contact with the subject's body within a range of a front projection of the subject's body at this time, and the contour collector is configured to obtain the position data of the distance measuring column.

4. The method for collecting the prone position data of the human body according to claim 1, wherein the pre-processing the data by the processing center includes:
calculating a distribution of the weight of the subject according to the weight data, the back contour data, and the height data.

5. The method for collecting the prone position data of the human body according to claim 1, wherein:
the elastic column includes a spring, a shell, and an adjusting member, the spring is located in the shell, an end of the spring is pressed against an end of the shell and another end of the spring is pressed against the adjusting member; and
it is necessary to increase the initial pressure when adjusting the initial pressure of the spring, and the adjusting member is configured to move in a direction in which the spring is compressed to cause the compression of the spring, thereby increasing the initial pressure of the spring.

6. The method for collecting the prone position data of the human body according to claim 5, wherein:
the elastic column further includes an inner tube and a flexible wire, the shell is sleeved on the inner tube;
the spring is located between the shell and the inner tube; and
the shell and the inner tube are connected by the flexible wire, so that a maximum length of a combination of the shell and the inner tube remains unchanged.

7. The method for collecting the prone position data of the human body according to claim 5, wherein:
the spring has an elastic coefficient of K, the initial pressure has a minimum value of Fmin, and the compression amount of the spring to be adjusted is Ln;
according to the analysis of the pre-processing data, it is concluded that an actual initial pressure of one of the elastic columns is to be adjusted to Fn;
according to a formulation Ln=(Fn−Fmin)/K, the compression amount Ln of the spring is calculated, and the adjusting member is caused to move by a distance Ln in the direction in which the spring is compressed;
according to the above formulation and pre-processing data, each spring is adjusted to have a corresponding compression amount Ln.

8. The method for collecting the prone position data of the human body according to claim 1, wherein:
the weight collector is provided with a height measuring rod configured to slide on the height measuring rod to measure the height of the human body when the subject stands on the weight collector;
the contour collector is configured to slide at a bottom of the weight collector, the contour collector includes a measuring plate and a plurality of distance measuring columns distributed on the measuring plate, a protruding head is provided at the top of the distance measuring column, and when the contour collector is pushed to press against the human body, the protruding head of the distance measuring column abuts on the human body, and the length of the distance measuring column is compressed;
the measuring plate is divided into an area A and an area B, and the plurality of the distance measuring columns are arranged on the area A and the area B respectively;
the processing center includes a single-chip micro-computer circuit for distance measurement for the area A, a single-chip micro-computer circuit for distance measurement for the area B, and a single-chip micro-computer of the simulated bed;
the single-chip micro-computer circuit for distance measurement for the area A and the single-chip micro-computer circuit for distance measurement for the area B are set, distance measurement circuit units of the area A are gated by a single-chip micro-computer U1 for the area A one by one, a distance measuring pulse is sent by a 36th pin of the single-chip micro-computer U1 for the area A and a return pulse is received by a 37th pin of the single-chip micro-computer U1 for the area A, and the height of each distance measuring column for the area A is calculated;
distance measurement circuit units of the area B are gated by a single-chip micro-computer U2 for the area B one by one, a distance measuring pulse is sent by a 36th pin of the single-chip micro-computer U2 for the area B and a return pulse is received by a 37th pin of the single-chip micro-computer U2 for the area B, and the height of each distance measuring column for the area B is calculated;
a serial port 1 of the single-chip micro-computer U1 for the area A is connected to a serial port 1 of the single-chip micro-computer U2 for the area B, and the height data of all the distance measuring columns for the area A is transmitted to a memory U11 of the single-chip micro-computer U2 for the area B for storage;
a program module for chip-selecting the distance measuring column for the area A, a program module for initializing the distance measuring column for the area A, a program module for distance measurement for the area A, a program module for displaying distance measurement for the area A, a program module for communication with the area B, and a program module for keyboard management for the area A are loaded in an area A program memory of the single-chip micro-computer U1 for the area A, and each of the above program modules are able to be called and executed by an area A main processor;
a program module for chip-selecting the distance measuring column for the area B, a program module for initializing the distance measuring column for the area B, a program module for distance measurement for the area B, a program module for displaying distance measurement for the area B, a program module for communication with the area A, a program module for keyboard management for the area B, a program module for unified storage, and a program module for communication with an elastic driven board are loaded in an area B program memory of the single-chip micro-computer U2 for the area B, and each of the above program modules are able to be called and executed by an area B main processor;

the elastic column includes a spring, and an initial pressure of a compression amount of the spring is adjusted by driving the spring with a motor;

a program module for communication with the single-chip micro-computer of the simulated bed, a program module for pressure A/D conversion, a program module for motor driving, and a program module for self-detection are loaded in a U4 program memory of a single-chip micro-computer U4 for the elastic column, and each of the above program modules are able to be called and executed by a main processor of the simulated bed;

the simulated bed is provided with a pressure sensor IC6 at the bottom-most of the elastic column, a pressure sensing circuit is configured to output a pressure analog voltage V0 to a circuit for driving a pressure detecting motor of the elastic column, a pin of a port P1 of the single-chip micro-computer U4 for driving detection in the circuit is connected to the pressure analogy pressure V0, a motor is located on the pressure sensor IC6 in the elastic column, and a pressure transmitted through the motor is sensed by the pressure sensor IC6;

the motor is driven by the single-chip micro-computer U4 for driving detection to rotate positively and reversely, thereby controlling the initial pressure of the elastic column;

a chip MAX487 for a RS485 communication interface is provided in a circuit for driving the pressure detecting motor of the elastic column, and the chip MAX487 is connected to a serial port of the single-chip micro-computer U4 for driving detection and a serial port 2 of the single-chip micro-computer U3 of the simulated bed;

a group of interfaces of the single-chip micro-computer U4 for driving detection is connected to a station number setting circuit constituted of DIP switches;

when driving data of the station number is sent from the single-chip micro-computer U3 of the simulated bed, the single-chip micro-computer U4 for driving detection drives the motor to operate according to the driving data and the spring is pressed, and at the same time, a reverse pressure is applied on the sensor IC6, and the pressure sensing circuit outputs an increased pressure voltage V0;

an A/D convertor inside the port P1 of the single-chip micro-computer U4 for driving detection converts an analogy voltage into digital data, and after comparison, when the external data and the local A/D conversion data are approximate each other, the motor stops operating;

when the initial pressure of all the elastic columns have been set, an elasticity display unit connected to the single-chip micro-computer U3 of the simulated bed displays a setting status of the initial pressure of each elastic column, and at this time, the subject experiences comfortability on the simulated bed and makes an improvement requirement subjectively; and at this time, improvement data is input through an elasticity command keyboard circuit and an elasticity data keyboard circuit, and the initial pressure of the elastic column in a relevant part is changed until the subject is satisfied, and the final data is recorded and stored in a SD card.

9. A system for collecting prone position data of a human body, comprising:

a weight collector, configured to collect weight data of a subject;

a contour collector, configured to collect back contour data of the subject, wherein the contour collector includes a measuring plate and a plurality of distance measuring columns distributed on the measuring plate, the measuring plate is movable relative to a standing plate of the subject, the measuring plate is configured to stop moving after moving to a preset position, and the contour collector is configured to obtain position data of the distance measuring column in a compressed state;

wherein at least one of the weight collector or the contour collector is provided with a height collection function for collecting height data of the subject;

a console, having a processing center located therein and configured to receive the weight data, the back contour data, and the height data and pre-process the weight data, the back contour data, and the height data received to form pre-processing data; and a simulated bed, configured to adjust an elastic column to have a specified initial pressure according to the pre-processing data, to provide the subject with comfortability.

10. The system for collecting the prone position data of the human body according to claim 9, wherein the weight collector is integrated with the contour collector, the weight data of the subject is collected while the height data is also collected, and the back contour data is also collected in the contour collector.

11. The system for collecting the prone position data of the human body according to claim 9, wherein:

the measuring plate is configured to move to the back of the subject, so that the distance measuring columns are gradually in contact with a back contour of the subject and compressed, and configured to stop moving when one of the distance measuring columns is compressed at a maximum compression amount; and all the distance measuring columns are in contact with the subject's body within a range of a front projection of the subject's body at this time, and the contour collector is configured to obtain the position data of the distance measuring column.

12. The system for collecting the prone position data of the human body according to claim 9, wherein:

the elastic column includes a spring, a shell, and an adjusting member, the spring is located in the shell, an end of the spring is pressed against an end of the shell and another end of the spring is pressed against the adjusting member; and it is necessary to increase the initial pressure when adjusting the initial pressure of the spring, and the adjusting member is configured to move in a direction in which the spring is compressed to cause the compression of the spring, thereby increasing the initial pressure of the spring.

13. The system for collecting the prone position data of the human body according to claim 12, wherein:

the elastic column further includes an inner tube and a flexible wire, the shell is sleeved on the inner tube;

the spring is located between the shell and the inner tube; and the shell and the inner tube are connected by the flexible wire, so that a maximum length of a combination of the shell and the inner tube remains unchanged.

14. A method for collecting prone position data of a human body, comprising:

causing a subject to stand on a weight collector, and collecting weight data of the subject with the weight collector;

causing the subject to stand, and collecting back contour data of the subject with a contour collector, wherein the contour collector includes a measuring plate and a plurality of distance measuring columns distributed on the measuring plate, the measuring plate is movable relative to a standing plate of the subject, the measuring plate is configured to stop moving after moving to a preset position, and the contour collector is configured to obtain position data of the distance measuring column in a compressed state;

collecting height data of the subject by the weight collector or the contour collector;

receiving the weight data, the back contour data, and the height data, pre-preprocessing the weight data, the back contour data, and the height data, and sending the pre-processed pre-processing data to a simulated bed by a processing center;

receiving the pre-processing data and adjusting an initial pressure of a plurality of elastic columns of a simulated bed according to the pre-processing data by the simulated bed, wherein the elastic column includes a spring, a shell, and an adjusting member, the spring is located in the shell, an end of the spring is pressed against an end of the shell and another end of the spring is pressed against the adjusting member; and it is necessary to increase the initial pressure when adjusting the initial pressure of the spring, and the adjusting member is configured to move in a direction in which the spring is compressed to cause the compression of the spring, thereby increasing the initial pressure of the spring;

causing the subject to lie on the adjusted simulated bed and further adjusting the simulated bed until the simulated bed is suitable for the subject; and collecting adjustment data of the simulated bed suitable for the subject by the processing center.

* * * * *